United States Patent
Ball et al.

(10) Patent No.: US 9,898,380 B1
(45) Date of Patent: Feb. 20, 2018

(54) AUTOMATIC VEHICLE WIRING AND CONFIGURATION VERIFICATION

(71) Applicant: Rockwell Collins, Inc., Cedar Rapids, IA (US)

(72) Inventors: Graham A. Ball, Kirkland (CA); Peter N. Brongel, Montreal (CA); Charles J. Sitter, Robins, IA (US); Nicholas H. Bloom, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 352 days.

(21) Appl. No.: 14/722,997

(22) Filed: May 27, 2015

(51) Int. Cl.
  *G06F 19/00* (2011.01)
  *G06F 11/30* (2006.01)

(52) U.S. Cl.
  CPC .................. *G06F 11/3027* (2013.01)

(58) Field of Classification Search
  CPC ............ H01L 2924/00; H01L 31/0504; G01R 31/31723
  USPC ........................................ 702/108, 182–185
  See application file for complete search history.

(56) References Cited

U.S. PATENT DOCUMENTS

| | | | |
|---|---|---|---|
| 2006/0247886 A1* | 11/2006 | Echevarria | G01R 31/318505 702/122 |
| 2010/0188097 A1* | 7/2010 | Sul | G01R 31/31717 324/537 |

* cited by examiner

*Primary Examiner* — Edward Raymond
(74) *Attorney, Agent, or Firm* — Angel N. Gerdzhikov; Donna P. Suchy; Daniel M. Barbieri

(57) ABSTRACT

Systems and methods for automated wiring and configuration verification are disclosed. A plurality of data buses may be tested utilizing a verification method disclosed herein. The verification method may include: transmitting a unique data sequence on each particular data bus of the plurality of data buses from a transmitting unit to a receiving unit, wherein the transmitting unit and the receiving unit are connected at least in part utilizing the particular data bus; analyzing a data sequence received at the receiving unit to determine a connection correctness for the particular data bus; and reporting the connection correctness for each particular data bus of the plurality of data buses to a user. The verification method is capable of not only detecting the presence of each bus, but also verifying the integrity of the connection provided by each bus. Various types of wiring faults may be detected effectively and efficiently.

12 Claims, 8 Drawing Sheets

AUTOMATIC VEHICLE WIRING AND CONFIGURATION VERIFICATION

BACKGROUND

Original Equipment Manufacturer (OEM) is a term used when one company makes a part or subsystem that is used in another company's end product. An aircraft OEM is typically required by aviation authorities (e.g., the Federal Aviation Administration, or FAA, of the United States) to verify that every single wire on an aircraft has been correctly installed and connected. Common wiring faults may include mis-wired ports, pushed pins, bent pins, and crossed wires (e.g., buses where high/low wires are crossed/swapped). Additional wiring faults that may occur in a network type connection may include incorrect installations of inserts into insert receptacles.

It is noted that the test procedures required to verify every wire on a completely assembled aircraft are very complex. Test procedures typically need to be designed to ensure that only the wire under test is active and that all other possible redundant paths have been disabled, usually by pulling the circuit breakers that power units that provide redundant data paths. It is also noted that troubleshooting wiring faults is very time consuming in a production environment when the aircraft has already been built and access to connectors is often very limited. In addition, certain regulations may prohibit any disturbance of the system during the verification process. In other words, all systems that have been disturbed during troubleshooting must then be retested prior to flight.

The complexities of the test procedures and the difficulties associated with carrying out these test procedures make testing of line-replaceable units or modules especially challenging. A line-replaceable unit (LRU), or a line-replaceable module (LRM), is a modular unit of an aircraft that is designed to be replaced quickly at an operating location. While it is required that each LRU be verified after installation to ensure that all wiring is correctly connected (e.g., without any mis-wired ports, pushed pins, bent pins, crossed wires, incorrect insertions and the like), currently available verification processes are only capable of detecting bus activities. This limited capability means that any bus connected to any port with any configuration of "high" and "low" wires will be verified as "good" under the currently available verification processes. Such verification processes are ineffective because they are only able to determine a mere presence of a bus, but are unable to determine the integrity of the connection provided by the bus. For instance, the presence of a bus having crossed wires may be detected and erroneously verified as "good" under the currently available verification processes.

Therein lies a need for systems and methods for automated verification of wiring without the aforementioned shortcomings.

SUMMARY

In one aspect, embodiments of the inventive concepts disclosed herein are directed to a method for testing a plurality of data buses. The method may include: transmitting a unique data sequence on each particular data bus of the plurality of data buses from a transmitting unit to a receiving unit, wherein the transmitting unit and the receiving unit are connected at least in part utilizing the particular data bus; analyzing a data sequence received at the receiving unit to determine a connection correctness for the particular data bus; and reporting the connection correctness for each particular data bus of the plurality of data buses to a user.

In a further aspect, embodiments of the inventive concepts disclosed herein are directed to a system. The system may include a plurality of units, a plurality of data buses connecting the plurality of units, and an analyzer in communication with the plurality of units. The analyzer may be configured to facilitate testing of the plurality of data buses, wherein testing of the plurality of data buses may include: transmitting an unique data sequence generated for each particular data bus of the plurality of data buses from a transmitting unit to a receiving unit, wherein the transmitting unit and the receiving unit are connected utilizing the particular data bus; and analyzing a data sequence received at the receiving unit of each particular data bus to determine a connection correctness for the particular data bus.

In another aspect, embodiments of the inventive concepts disclosed herein are also directed to a system. The system may include a plurality of units and a plurality of data buses connecting the plurality of units. At least one of the plurality of units may be configured to function as an analyzer, wherein the analyzer is configured to facilitate testing of data connections with the plurality of units through the plurality of data buses. The testing carried out by the analyzer may include: sending a request from the analyzer to each of the plurality of units; receiving a unique data sequence from each of the plurality of units in response to the request; and analyzing the unique data sequence received from each of the plurality of units to determine a connection correctness for each of the plurality of units.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Figure 1:
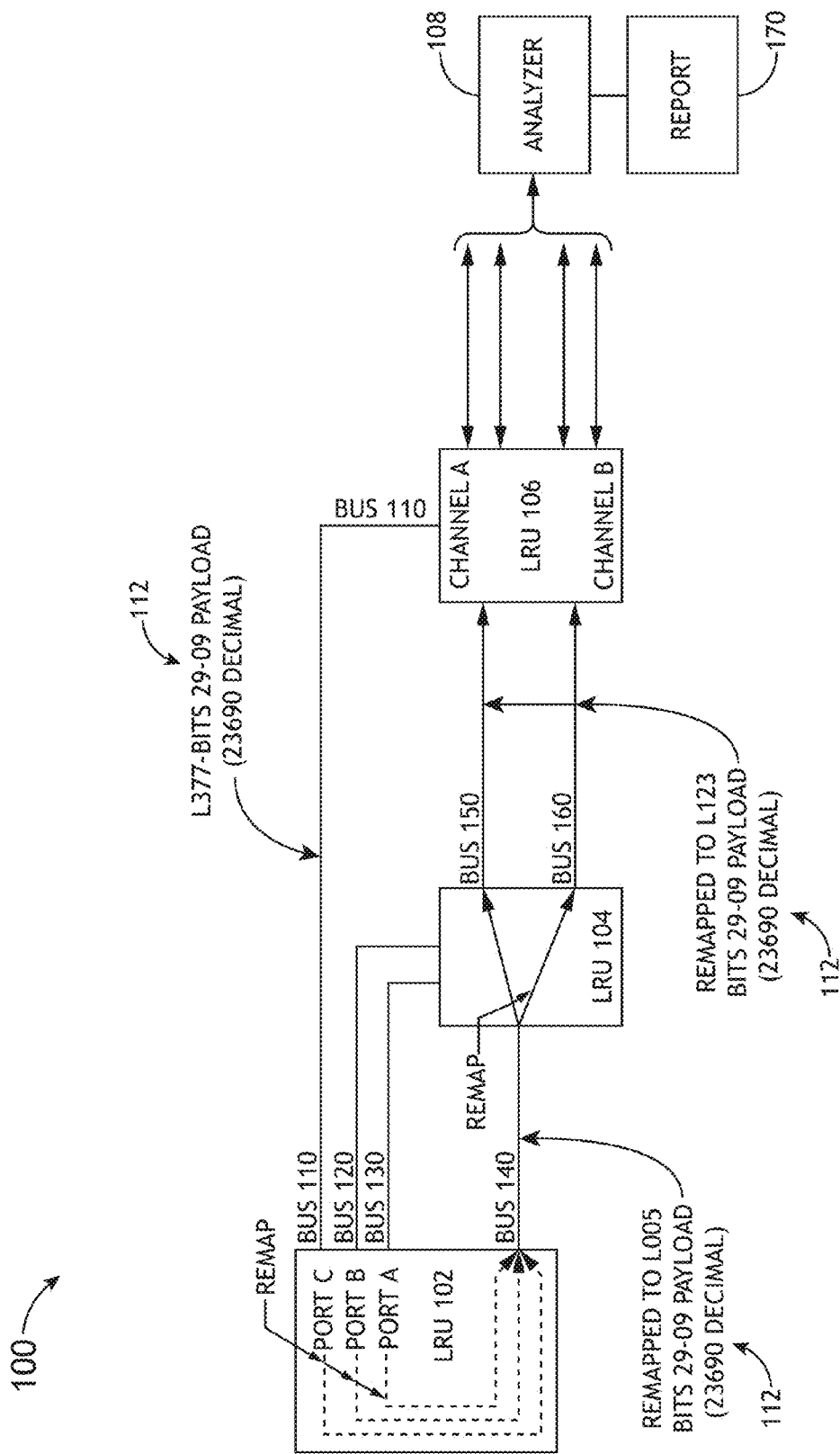
FIG. 1 is a block diagram depicting an exemplary subsystem and a flow of a data sequence utilized to test a data bus within the exemplary subsystem.

Reference will now be made in detail to exemplary embodiments of the inventive concepts disclosed herein, examples of which are illustrated in the accompanying drawings.

Embodiments in accordance with the inventive concepts disclosed herein are directed to systems and methods for automated verification of aircraft wiring. More specifically, systems and methods for automated verification of unidirectional wiring (such as that described in the ARINC 429 specification, where a data sequence is propagated through multiple units in a directional manner) as well as network wiring (such as that described in the ARINC 664 specification, where command and response protocols such as Avionics Full-Duplex Switched Ethernet, or Ethernet in general, are supported using data networks/buses) are disclosed herein. It is contemplated that the verification processes in accordance with the inventive concepts disclosed herein may be capable of not only detecting the presence of each bus, but also verifying the integrity of the connection provided by each bus. Wiring faults such as mis-wired ports, pushed pins, bent pins, crossed wires, incorrect insertions and the like may be detected in effective and efficient manners utilizing the verification processes disclosed herein.

An effective way to verify whether high/low wires in a bus have been crossed is to examine the data received. Using the ARINC 429 specification as an example, wherein labels are utilized to facilitate communications, an effective way to determine whether wires in a bus have been crossed is to verify receipt of label 377. Label 377 in accordance with the ARINC 429 specification is represented by 377 (octal), which is 11111111 (binary). That is, if the high/low wires in a bus have been crossed, label 377 transmitted on that bus would appear as the complement of label 377 to a receiver on the receiving end of that bus. In other words, if the wires in the bus have been crossed, the receiver would receive label 000, or 00000000 (binary), instead of label 377 originally transmitted by the transmitter. Since label 000 is invalid per the ARINC 429 specification and is therefore discarded if it is ever received, the presence or absence of label 377 can be used to detect crossed wires.

It is to be understood that the specific references to label 377 and label 000 in the examples above are merely exemplary. They are used to illustrate how to detect/verify potential crossed wire issues using complementary labels (or a part of a received data sequence in general). It is contemplated that other pairs of complementary labels (e.g., label 376 and its complementary label 001) may be utilized without departing from the broad scope of the inventive concepts disclosed herein.

It is noted that while complementary labels as described above can be utilized to effectively detect crossed wire issues, using complementary labels alone may not be sufficient to address other types of connection issues (e.g., mis-wired ports, pushed pins, bent pins and the like). To accomplish this, each bus may be required to carry a data sequence (e.g., as the payload of the label being transmitted) that is uniquely associated with that specific bus. For unidirectional buses (e.g., the ARINC 429 specification) that are used to propagate data sequences through multiple units (e.g., LRUs), each unique data sequences has a direct correlation to a specific data bus (i.e., wiring between two units), allowing connection issues on specific data buses to be identified by analyzing the propagated data sequences. In other words, each unique data sequence (carried as payload) may be routed through various units of the system and eventually provided to an analyzer, which may be configured to detect and process the received payload and use the uniqueness of the received payload (which uniquely identifies the specific bus being tested) to verify the integrity of that specific bus.

FIGS. 1-4 are illustrations showing some exemplary verification processes implementing the techniques described above for verifying a subsystem 100. More specifically, the subsystem 100 may include some exemplary units of an aircraft, including LRU 102, LRU 104, and LRU 106. It is noted that the various units are connected using buses 110, 120, 130, 140, 150, and 160, all of which may be verified utilizing the verification processes described herein. It is to be understood that the specific units and buses shown in FIGS. 1-4 are merely exemplary. Buses connecting any units on the aircraft (or a vehicle in general) may be verified in the same manner without departing from the broad scope of the inventive concepts disclosed herein.

Referring to FIG. 1, a verification process utilized to verify the integrity of the bus 110 is shown. As shown in FIG. 1, a payload 112 that is uniquely associated with the bus 110 is generated and transmitted from a transmitting unit (in this case the LRU 106) to a receiving unit (in this case the LRU 102). It is contemplated that various schemes may be utilized to generate a payload that is uniquely associated with (in other words, uniquely identifies) a given bus. The following table presents an exemplary bit structure that may be utilized in one particular implementation:

| Description | Number of Bits | Bit Range |
| --- | --- | --- |
| TX Device ID | 11 | 29-19 |
| TX Unit Position | 3 | 18-16 |
| TX Unit Channel | 1 | 15 |
| TX Port | 6 | 14-9 |

As shown in the table above, bits 29-19 of the payload 112 may include a type identifier that identifies the type of the transmitting unit. For instance, every type of unit within an aircraft system may be assigned a predefined type identifier. The transmitting unit on the bus 110 in this case, the LRU 106, is a "data converter", which may be assigned a type identifier, which may be included in bits 29-19 of the payload 112. Bits 18-16 of the payload 112 may include positional information of the transmitting unit. The positional information may identify, for example, whether the transmitting unit (e.g., LRU 106) is a unit positioned at "Location-1", "Location-2", "Location-3", and so on. Bit 15 of the payload 112 may include channel information, and bits 14-9 of the payload 112 may include port information.

It is contemplated that the payload 112 constructed according to the bit structure described above may be able to uniquely identify the bus 110. It is to be understood, however, that the bit structure described herein is merely exemplary. Various other schemes may be utilized to generate unique identifiers for the buses under test without departing from the broad scope of the inventive concepts disclosed herein.

Referring back to FIG. 1, the label utilized to facilitate the transmission of the unique payload 112 from the LRU 106 to the LRU 102 is label 377. Label 377 is utilized in this case to test for any crossed wire issues on the bus 110 as previously described. That is, if the high/low wires in the bus 110 have been crossed, label 377 would become label 000, which would be invalid and would therefore be discarded by the LRU 102. This would effectively stop the data flow, causing a fault to be reported. If, on the other hand, the bus 110 does not experience any crossed wire issues, the LRU 102 may receive the payload 112 from the LRU 106 as expected, and subsequently pass the payload 112 via the bus 140 to the LRU 104. The LRU 104 may then pass the payload 112 via both buses 150 and 160 (i.e., fan out on every connection) to the LRU 106, which may eventually pass the payload 112 to an analyzer 108. The analyzer 108 (e.g., a processor) may process the payload 112 received, which may contain information regarding the transmitting unit's device identifier, unit position, unit channel and port number, which can be used to help verify whether or not the connection behaves as intended. If no unexpected error has occurred, the analyzer 108 may indicate that the bus 110 has passed the verification process.

It is noted that label 377 is only used on the bus 110 for transmission of the unique payload 112 from the LRU 106 to the LRU 102. The label is then remapped subsequently each time it passes through another unit (e.g., the LRU 102, the LRU 104 and the like). Remapping is used in this manner to prevent duplicate label numbers on the same bus (which may occur in a complex system if remapping is not utilized) since duplicate label numbers are not permissible per the ARINC 429 specification. It is contemplated that any remapping scheme that is capable of deterministically producing a new (remapped) label for a received label can be used. The remapping process may be carried out utilizing a lookup table, for example, or calculated in real time based on an established calculation process, as long as the remapping process is deterministic so that the analyzer 108 is fully aware of the labels that may be remapped (and how they are remapped). It is also contemplated, however, that it may be possible to implement the testing process as described above without remapping the labels if the system is relatively simple.

It is also noted that label 377 is not the only label that can be used to test for crossed wire issues on the bus 110. As mentioned previously, other labels may be utilized to serve the same purpose, as long as the transmitter and the receiver are in agreement as to which label is used by the transmitter so that the receiver can properly identify the error if a complementary label is received. For purposes of presentation simplicity, label 377 is utilized in the examples presented herein to indicate where crossed wire issues are being verified.

Figure 2:
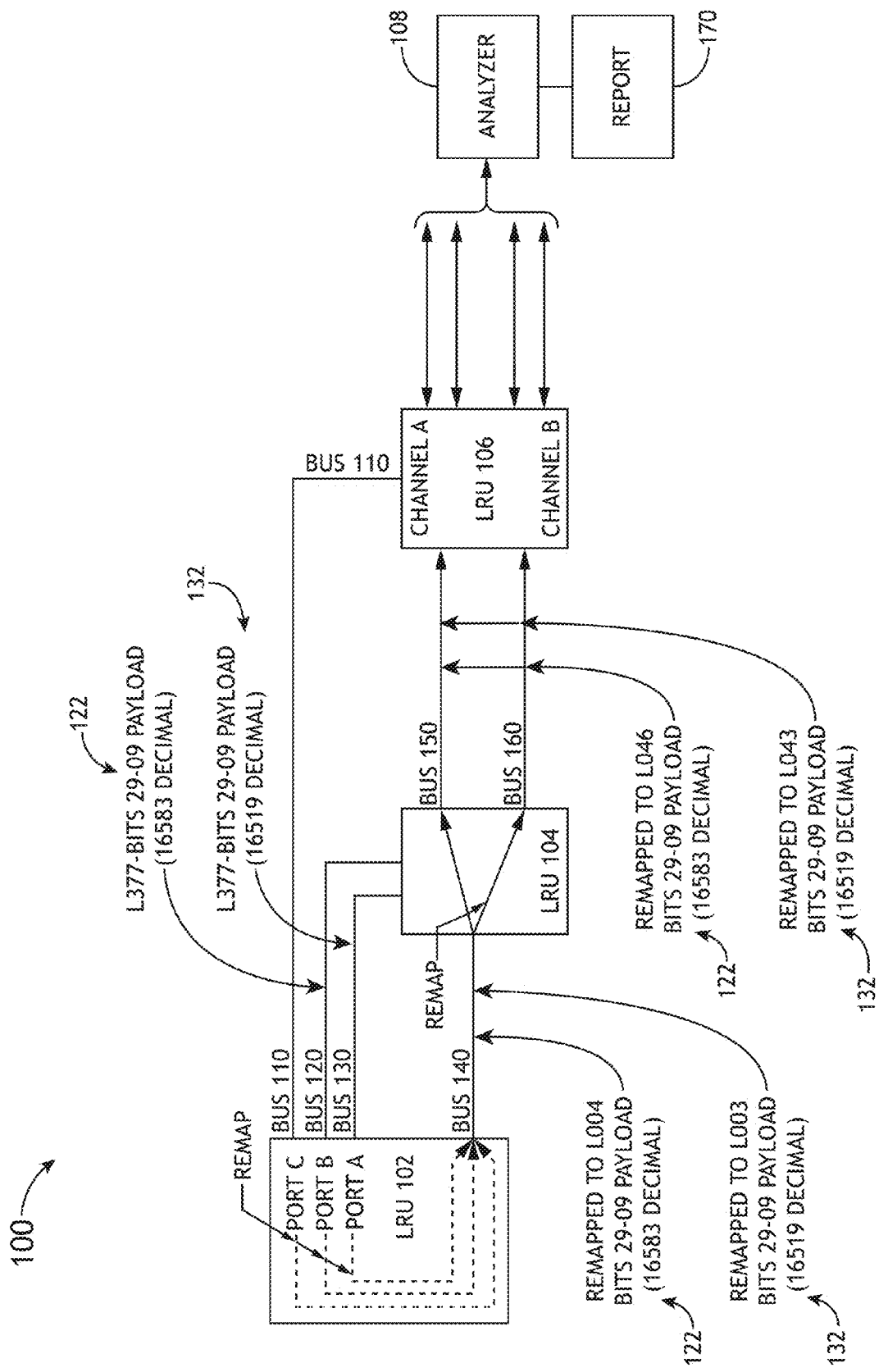
FIG. 2 is a block diagram depicting the exemplary subsystem of FIG. 1 and a flow of another data sequence utilized to test another data bus within the exemplary subsystem.

Referring now to FIG. 2, similar verification processes utilized to verify the integrities of the buses 120 and 130 are shown. It is noted that FIG. 1 and FIG. 2 are shown separately for illustrative purposes, however, it is contemplated that the verification processes shown in FIG. 1 and FIG. 2 (as well as FIGS. 3 and 4 that will be described later) may be carried out sequentially or concurrently without departing from the broad scope of the inventive concepts disclosed herein. As shown in FIG. 2, a payload 122 that is uniquely associated with the bus 120 may be generated and transmitted from a transmitting unit (in this case the LRU 104) to a receiving unit (in this case the LRU 102). Again, label 377 may be utilized to facilitate the transmissions of the payload 122. If the wires in the bus 120 are crossed, the LRU 102 will not receive the payload 122, and a fault may be reported. Otherwise, the LRU 102 may receive the payload 122, which may then be passed (and remapped if necessary) through other units and eventually provided to the analyzer 108. The analyzer 108 may process the payload 122 in a similar manner as previously described to determine whether or not the bus 120 has passed the verification process. The same process may be carried out to verify the bus 130 using a payload 132 that is uniquely associated with the bus 130.

Figure 3:
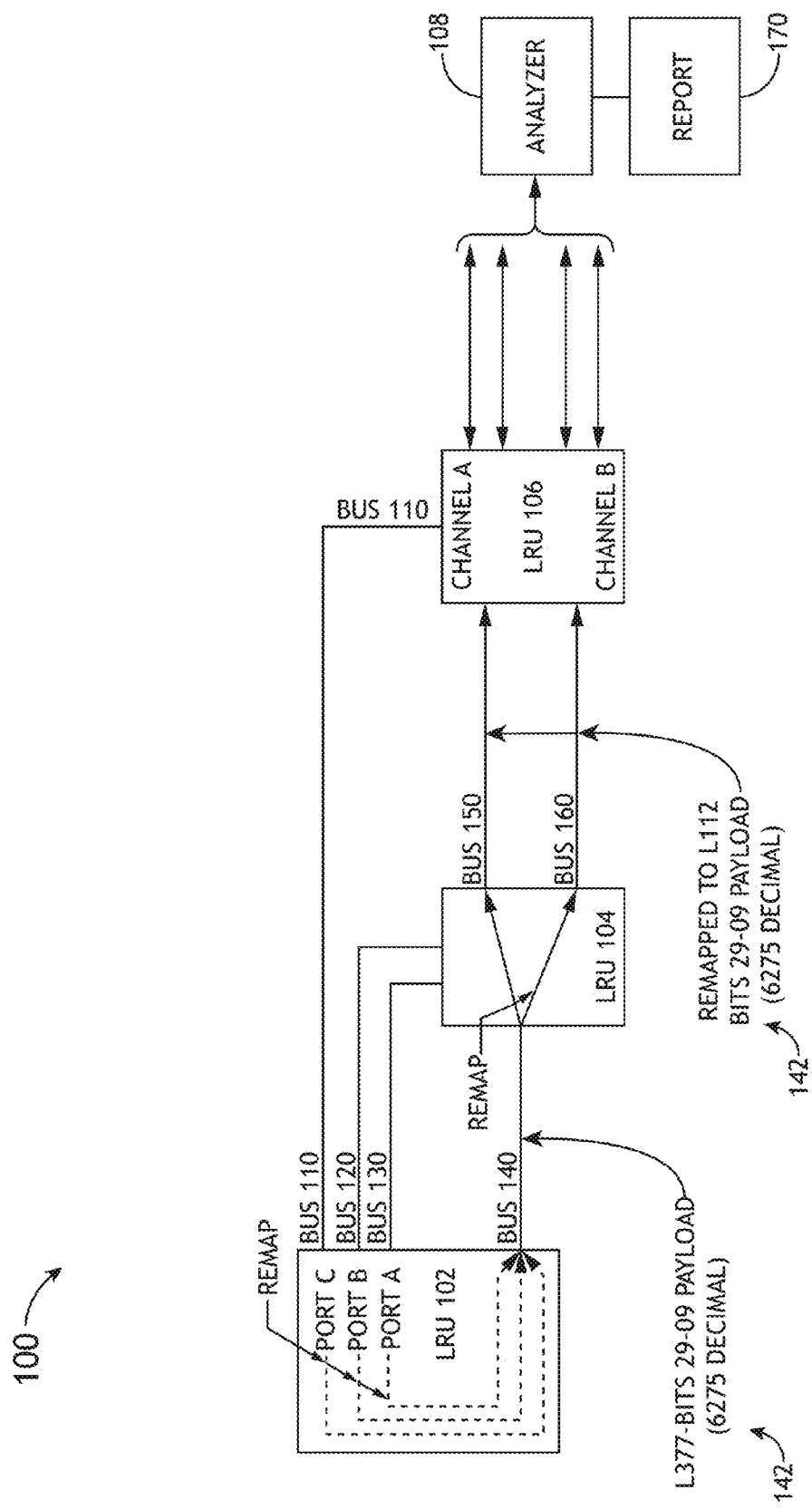
FIG. 3 is a block diagram depicting the exemplary subsystem of FIG. 1 and a flow of another data sequence utilized to test another data bus within the exemplary subsystem.

FIG. 3 shows another verification process that may be carried out sequentially or concurrently with the verification processes described above. As shown in FIG. 3, a payload 142 that is uniquely associated with the bus 140 may be generated and transmitted from a transmitting unit (in this case the LRU 102) to a receiving unit (in this case the LRU 104). Label 377 may be utilized again to facilitate the transmissions of the payload 142. If no crossed wire issue has been detected on the bus 140, the LRU 104 may receive the payload 142, which may then be passed (and remapped if necessary) to the analyzer 108. The analyzer 108 may process the payload 142 in a similar manner as previously described to determine whether or not the bus 140 has passed the verification process.

Figure 4:
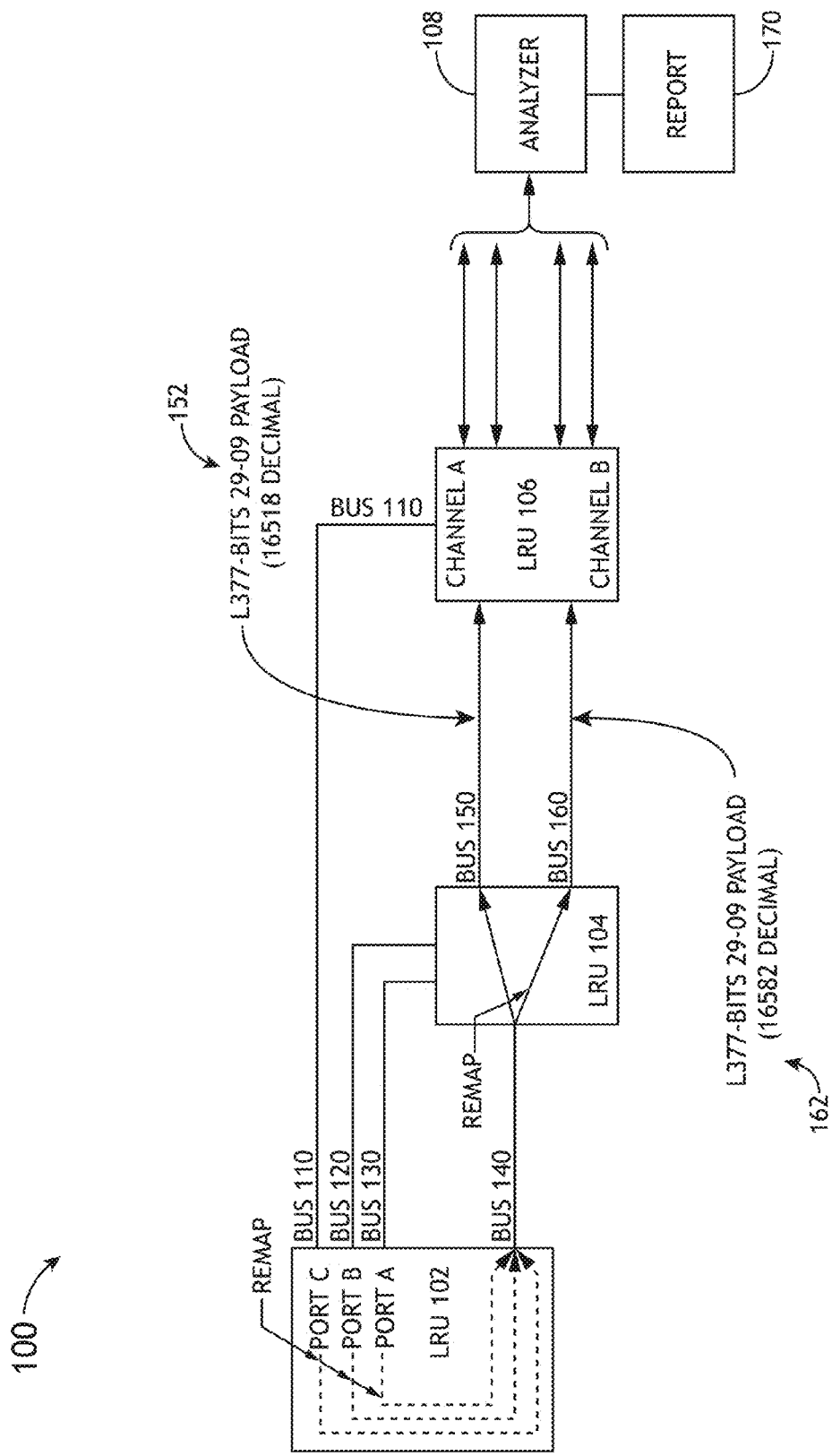
FIG. 4 is a block diagram depicting the exemplary subsystem of FIG. 1 and a flow of another data sequence utilized to test another data bus within the exemplary subsystem.

FIG. 4 shows additional verification process that may be carried out sequentially or concurrently with the verification processes described above. As shown in FIG. 4, the buses 150 and 160 are being tested. To test the bus 150, a payload 152 that is uniquely associated with the bus 150 may be generated and transmitted from a transmitting unit (in this case the LRU 104) to a receiving unit (in this case the LRU 106). Label 377 may be utilized again to facilitate the transmissions of the payload 152. If no crossed wire issue has been detected on the bus 150, the LRU 106 may receive the payload 152, which may then be passed (and remapped if necessary) to the analyzer 108. The analyzer 108 may process the payload 152 to determine whether or not the bus 150 has passed the verification process. It is noted that the same process may be carried out to verify the bus 160 using a payload 162 that is uniquely associated with the bus 160.

At this point, every bus that is used to connect the LRU 102, the LRU 104, and the LRU 106 in the subsystem 100 has been tested for both crossed wire issues and connection issues. It is contemplated that this process may be carried out to test wiring of other systems/subsystems within the aircraft, and the analyzer 108 may collect and analyze all payloads received to generate a report 170. The report 170 may be displayed or otherwise communicated to a responsible party (e.g., an OEM manufacturing personnel or the like) to indicate the test result.

While the report 170 provided by the analyzer 108 may be a simple overall pass/fail indicator, it is contemplated that more sophisticated test results may also be made available in the report 170. It is noted that because there is a unique association between payloads and buses, particular buses that failed the test may be identified and indicated in the report 170. Additionally, because a payload may also contain information regarding its corresponding transmitting unit's device identifier, unit position, unit channel and port number, specific errors may be localized and presented in the report 170. It is contemplated that the amount of details provided in the report 170 may be customized and/or dynamically controlled, and the specific format of the report 170 may vary without departing from the broad scope of the inventive concepts disclosed herein.

It is to be understood that while the examples described above referenced the ARINC 429 specification, such references are merely exemplary; the verification processes in accordance with the inventive concepts disclosed herein are applicable to various other types of digital data buses, including bidirectional and/or network buses, without departing from the broad scope of the inventive concepts disclosed herein.

Figure 5:
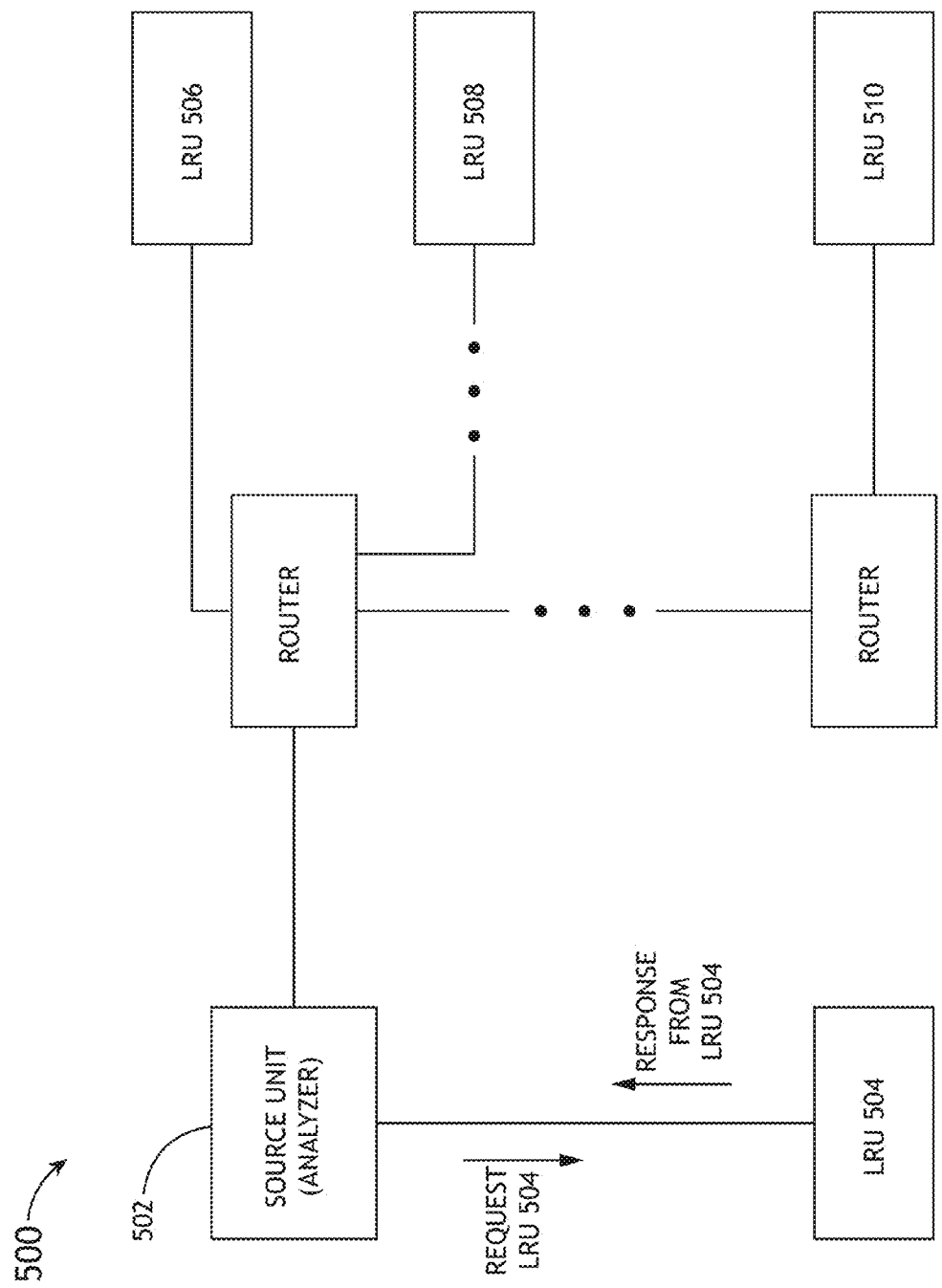
FIG. 5 is a block diagram depicting another exemplary subsystem and a flow of a data sequence utilized to test connection correctness of the data buses within the exemplary subsystem.
Figure 6:
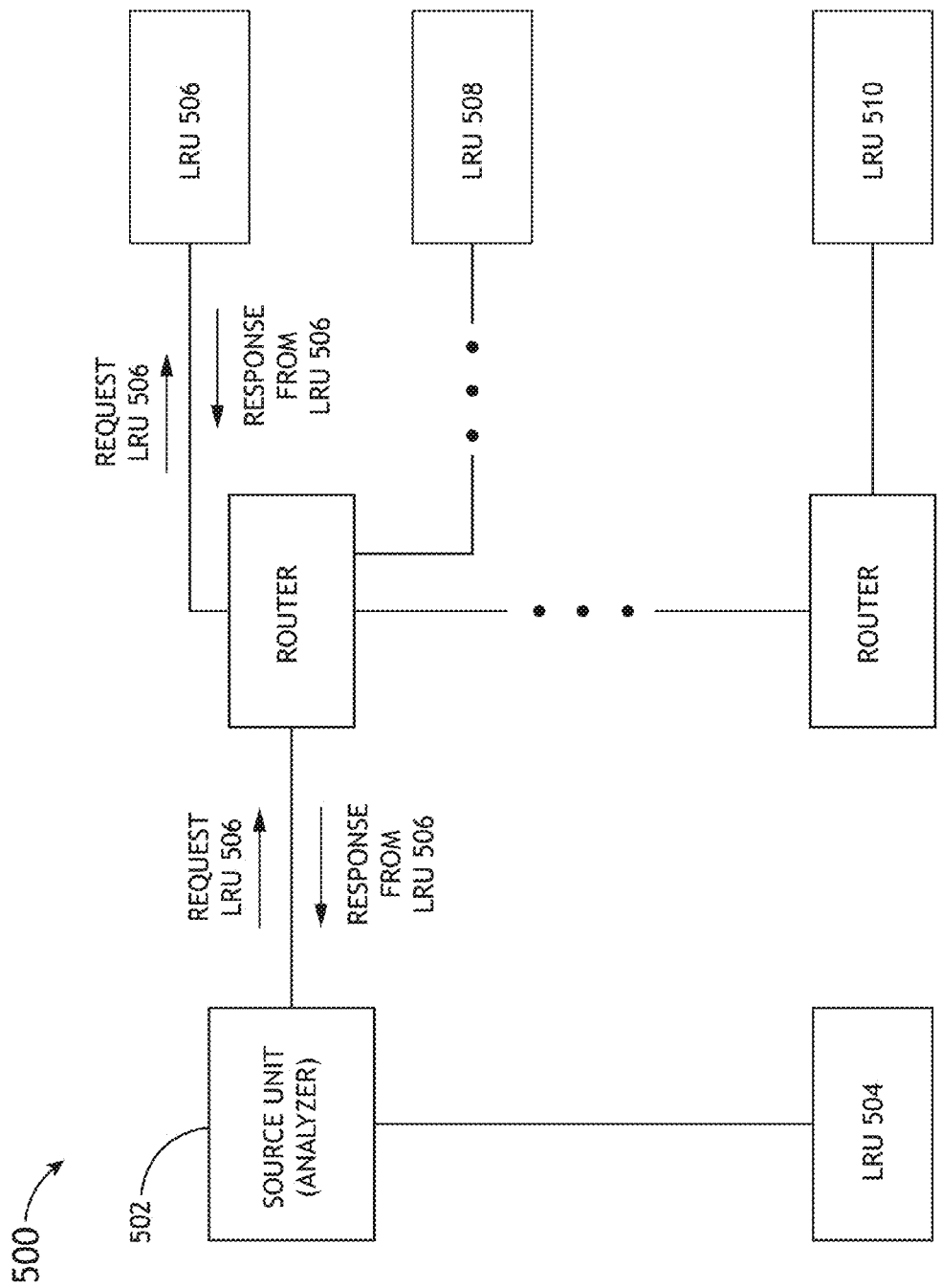
FIG. 6 is a block diagram depicting the exemplary subsystem of FIG. 5 and a flow of another data sequence utilized to test connection correctness of the data buses within the exemplary subsystem.
Figure 7:
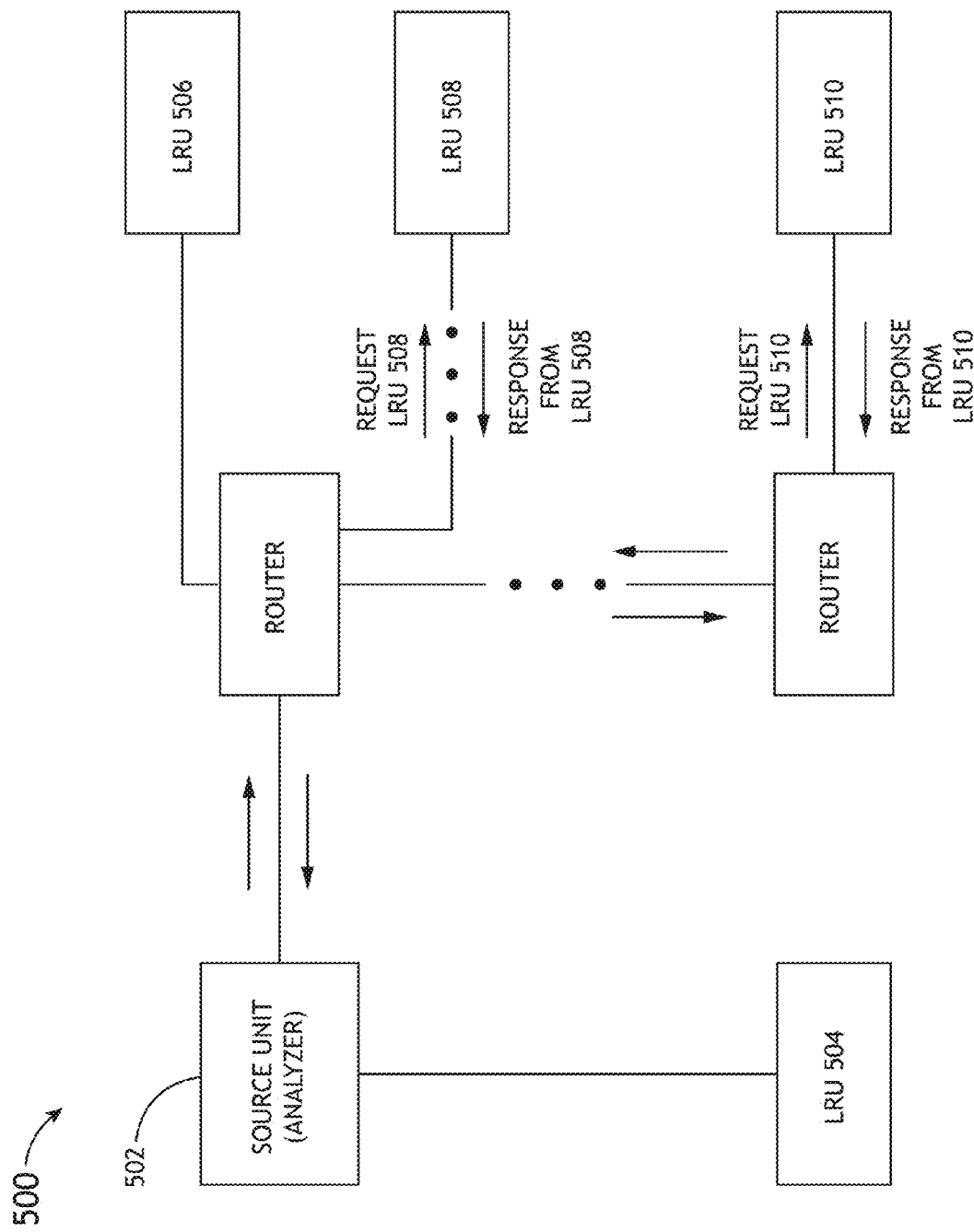
FIG. 7 is a block diagram depicting the exemplary subsystem of FIG. 5 and a flow of another data sequence utilized to test connection correctness of the data buses within the exemplary subsystem.

For example, a data network implementation may use network buses (which may be implemented as bidirectional buses or pairs of unidirectional buses). The verification process may therefore be implemented based on a request and response approach. FIGS. 5-7 are block diagrams depicting a subsystem 500 that includes a plurality of units connected by a plurality of buses, forming a data network as shown. As depicted in FIGS. 5-7, a request (e.g., a "ping") may be sent (sequentially or concurrently) from a source unit 502 to all end units (e.g., LRUs 504 through 510) connected to the source unit 502 within the network. Upon receiving the request, each end unit may respond to the source unit 502 with a unique response. More specifically, since every unit on the network has a unique address or ID, each end unit may respond to the source unit 502 with a data message that ties it to the original request and uniquely identifies the end unit. The source unit 502 may then function as an analyzer to analyze the responses received from all end units and verify the connection correctness of the network.

More specifically, as shown in FIG. 5, the source unit 502 may send a request to the LRU 504 and expect a unique response to be returned from the LRU 504. If no response is returned from the LRU 504, or if the response from the LRU 504 is not as expected, the source unit 502 may recognize that as an error. Similarly, the source unit 502 may send a request to the LRU 506 and expect another unique response to be returned from the LRU 506. As shown in FIG. 6, one or more routers (or network switches) may be utilized to facilitate communications between the source unit 502 and the LRU 506, but the test may be carried out in the same manner as that depicted in FIG. 5. In other words, if no response is returned from the LRU 506, or if the response from the LRU 506 is not as expected, the source unit 502 may recognize that as an error (i.e., a wiring fault exists between the source unit 502 and the LRU 506). It is contemplated that this test may be carried out for all end units (LRUs) that are connected to the source unit 502 within the network, as shown in FIGS. 5-7, allowing the source unit 502 to verify its wiring with every component in the network that the source unit 502 is connected to.

It is contemplated that a complete end-to-end test may be performed in this manner to verify the connection correctness of the entire network. It is also contemplated that if redundant data paths exist in the network, the request and response based verification process may be configured to transmit only on a single path, and the source unit 502 (i.e., the analyzer) may be configured to send requests on each path to ensure that the source unit 502 only receives one response for each intended end unit. Alternatively, the request and response protocol used to carry out the verification process may be designed so that it does not use the redundant data paths provided in the network. The source unit 502 (i.e., the analyzer) may be configured to send separate requests on every redundant path to completely test the network. Upon completion of the test, a report may be generated to identify all correct and incorrect wiring within the network. The report may be displayed or otherwise communicated to a responsible party. As previously described, because there is a unique association between the responses and the buses that are connected to the end units, particular buses that failed the test may be identified and indicated in the report.

It is to be understood that the various types of reports described above (e.g., directional bus verification report and network bus verification report) may be consolidated and provided as a part of an overall configuration report. This configuration report may include information (e.g., wiring information as well as hardware and software configuration data) regarding a subcomponent or an entire aircraft. It is contemplated that the report may be structured for display either on or off the aircraft, and the format of the report may be customized and/or changed without departing from the broad scope of the inventive concepts disclosed herein. It is contemplated that such a report may be appreciated for various purposes. For example, a user (e.g., an OEM) may utilize the report to help troubleshooting faults identified during manufacturing, modification, or maintenance processes. If no fault is identified, the user may keep the report as a configuration record of the aircraft and a verification of correct wiring.

It is to be understood that while aircrafts are mentioned in the examples above, these examples are not meant to be limiting. It is contemplated that the verification processes in accordance with the inventive concepts disclosed herein may be utilized to verify wiring in other types of systems as well without departing from the broad scope of the inventive concepts disclosed herein, including other types of vehicles such as land vehicles, maritime vehicles, space vehicles and the like.

Figure 8:
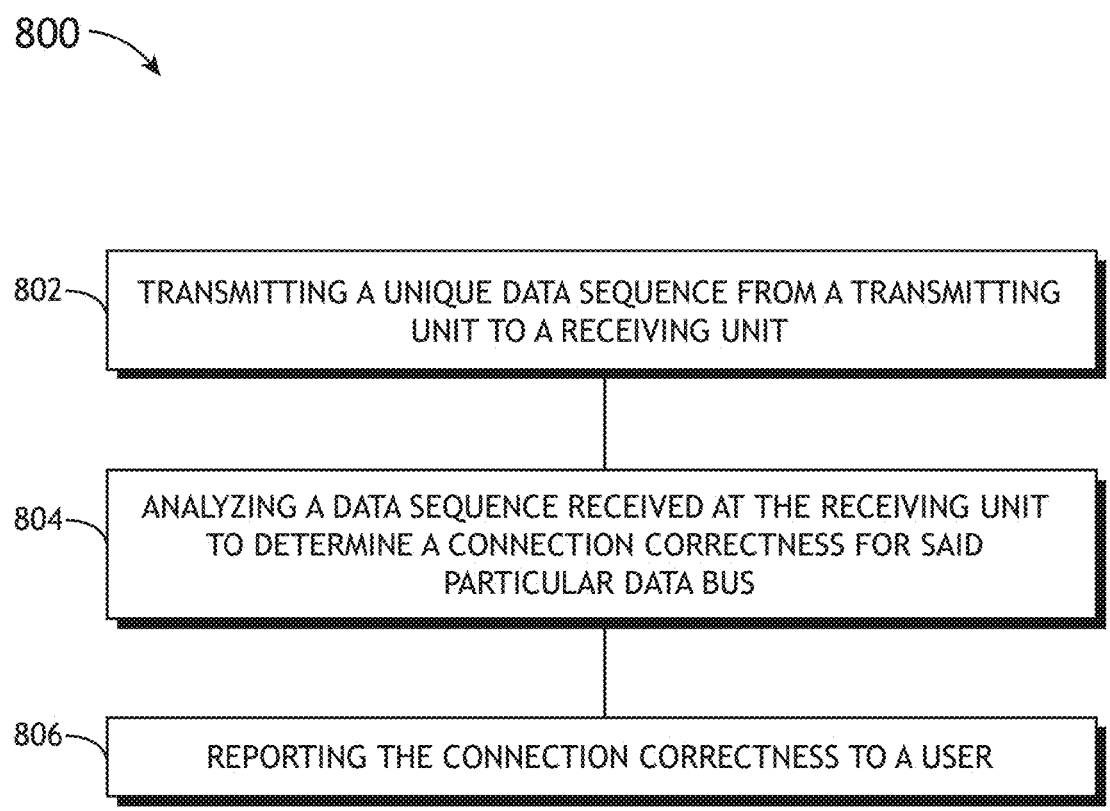
FIG. 8 is a flow diagram depicting an embodiment of a method for testing connection correctness of a plurality of data buses.

Referring now to FIG. 8, a flow diagram depicting an embodiment of a method 800 for testing connection correctness of a plurality of data buses is shown. The plurality of data buses may be utilized to connect a plurality of units within a system (e.g., a plurality of LRUs in an aircraft). As previously described, unique data sequences may be generated to facilitate the testing process. More specifically, a unique data sequence may be transmitted from a transmitting unit to a receiving unit in a step 802. The unique data sequence may include information regarding the transmitting unit type, the transmitting unit position, the transmitting unit channel, the transmitting unit port, as well as other information that may help uniquely identify the transmitting unit and/or the buses they are associated with.

If the data buses used to connect the various units within the system are unidirectional data buses, each unit within the system, upon receiving a data sequence from a transmitting unit, may be configured to provide that data sequence to an analyzer (as depicted in FIGS. 1-4) for further analysis. If the data buses used to connect the various units within the system are network buses, one of the units within the system may function as an analyzer (as depicted in FIGS. 5-7), which may send requests to all end units that the analyzer is connected with and wait for a response from each of the end units. In this case, each end units may function as a transmitting unit that, upon receiving a request from the analyzer, transmits a unique data sequence back to the analyzer (which functions as a receiving unit to receive the unique data sequences). The analyzer may then process each unique data sequence received in a step 804 and determine the connection correctness for each data bus represented by each unique data sequence.

It is contemplated that the analyzer may utilize a dedicated processing unit, an application-specific integrated circuit (ASIC), an integrated component of an existing hardware or firmware configured to control or monitor operations of the system, or various other types of processors or processing units to carry out the analysis. As mentioned previously, because there is a unique association between data sequences and the data buses, particular buses that failed the test may be identified effectively and efficiently. Upon completion of the test, the analyzer may prepare an analysis report and present the report to a user (e.g., a party responsible for installation, inspection, modification, maintenance, repair or the like) in a step 806. The report may indicate connection correctness for each data bus tested, and the report may be presented on a display device, printed as a hard copy, or electronically communicated to the user.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A system, comprising:
    a plurality of units;
    a plurality of data buses connecting the plurality of units; and
    an analyzer in communication with the plurality of units, the analyzer configured to facilitate testing of the plurality of data buses, wherein said testing of the plurality of data buses comprises:
        transmitting an unique data sequence generated for each particular data bus of the plurality of data buses from a transmitting unit to a receiving unit, wherein the transmitting unit and the receiving unit are connected utilizing said particular data bus;
        analyzing a data sequence received at the receiving unit of each particular data bus to determine a connection correctness for said particular data bus; and
        presenting a configuration report, the configuration report including wiring information, hardware data, and software configuration data of the plurality of units and the plurality of data buses; and
    a display configured to present the configuration report to a user.

2. The system of claim 1, wherein said testing of the plurality of data buses further comprises determining whether each particular data bus of the plurality of data buses contains crossed wires based on whether a portion of the data sequence received at the receiving unit of each particular data bus is a complement of a corresponding portion of the data sequence transmitted from the transmitting unit of said particular data bus.

3. The system of claim 2, wherein the portion of the data sequence utilized for determining whether said particular data bus contains crossed wires is a label utilized to facilitate transmission of the data sequence.

4. The system of claim 1, wherein the unique data sequence generated for each particular data bus identifies at least one of: a transmitting unit type, a transmitting unit position, a transmitting unit channel, and a transmitting unit port.

5. The system of claim 1, wherein each particular data bus of the plurality of data buses is configured to transmit the unique data sequence generated for said particular data bus at least once.

6. The system of claim 1, wherein the plurality of units are installed on a vehicle.

7. The system of claim 6, wherein at least one of the plurality of units is a line-replaceable unit.

8. A system, comprising:
    a plurality of units, wherein at least one of the plurality of units is a line-replaceable unit installed on a vehicle; and
    a plurality of data buses connecting the plurality of units, wherein at least one of the plurality of units is configured to function as an analyzer, wherein the analyzer is configured to facilitate testing of data connections with the plurality of units through the plurality of data buses, wherein said testing comprises:
        sending a request from the analyzer to each of the plurality of units;
        receiving a unique data sequence from each of the plurality of units in response to the request;
        analyzing the unique data sequence received from each of the plurality of units to determine a connection correctness for each of the plurality of units; and
        presenting a configuration report, the configuration report including wiring information, hardware data, and software configuration data of the plurality of units and the plurality of data buses; and
    a display, located within the vehicle, configured to present the configuration report to a user.

9. The system of claim 8, wherein the configuration report includes identification of a failed bus.

10. The system of claim 8, wherein the configuration report includes a bus verification report and a network bus verification report.

11. The system of claim 8, wherein the configuration report is employed as a verification record when no fault is identified.

12. The system of claim 8, wherein the unique data sequence includes a device identifier information, a position information, a channel information, and a port number information.

* * * * *